(12) United States Patent
Handa et al.

(10) Patent No.: US 10,976,276 B2
(45) Date of Patent: Apr. 13, 2021

(54) NANOFIBER SENSOR

(71) Applicant: SHARP KABUSHIKI KAISHA, Sakai (JP)

(72) Inventors: Shinichi Handa, Sakai (JP); Takuya Sato, Sakai (JP); Akihide Shibata, Sakai (JP); Hiroshi Iwata, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 79 days.

(21) Appl. No.: 16/327,533

(22) PCT Filed: Apr. 17, 2017

(86) PCT No.: PCT/JP2017/015466
§ 371 (c)(1),
(2) Date: Feb. 22, 2019

(87) PCT Pub. No.: WO2018/042748
PCT Pub. Date: Mar. 8, 2018

(65) Prior Publication Data
US 2019/0242843 A1  Aug. 8, 2019

(30) Foreign Application Priority Data
Aug. 31, 2016  (JP) .............................. JP2016-168919

(51) Int. Cl.
*G01N 27/12*  (2006.01)
*B82Y 15/00*  (2011.01)

(52) U.S. Cl.
CPC ......... *G01N 27/128* (2013.01); *G01N 27/127* (2013.01); *B82Y 15/00* (2013.01)

(58) Field of Classification Search
CPC .......................... G01N 27/128; G01N 27/127
See application file for complete search history.

(56) References Cited

U.S. PATENT DOCUMENTS

| | | | |
|---|---|---|---|
| 8,115,198 B2* | 2/2012 | Bondavalli | B82Y 15/00 257/40 |
| 9,181,630 B2* | 11/2015 | Shibata | H01L 25/0753 |
| 2008/0210987 A1 | 9/2008 | Bondavalli et al. | |
| 2013/0031987 A1* | 2/2013 | Beauvais | G01B 7/18 73/774 |
| 2017/0350856 A1* | 12/2017 | Kobayashi | C01B 32/16 |

FOREIGN PATENT DOCUMENTS

| | | |
|---|---|---|
| JP | 2006-329802 A | 12/2006 |
| JP | 2009-210458 A | 9/2009 |

* cited by examiner

*Primary Examiner* — Reena Aurora
(74) *Attorney, Agent, or Firm* — ScienBiziP, P.C.

(57) ABSTRACT

A nanofiber sensor includes a plurality of pairs of electrodes and nanofibers respectively bridging the gaps between the electrodes in the pair, between the electrodes in the pair, and between the electrodes in the pair. At least two pairs of electrodes of the plurality of pairs of electrodes are different from each other in structures.

20 Claims, 13 Drawing Sheets

NANOFIBER SENSOR

INCORPORATION BY REFERENCE

The present application contains subject matter related to that disclosed in Japanese Priority Patent Application No. 2016-168919 filed in the Japan Patent Office on Aug. 31, 2016, the entire contents of which are hereby incorporated by reference.

TECHNICAL FIELD

The present invention relates to a nanofiber sensor.

BACKGROUND ART

As a related nanofiber sensor in a broad sense, a carbon nanotube sensor is disclosed in Japanese Unexamined Patent Application Publication No. 2006-329802 (PTL 1).

In the related carbon nanotube sensor, as illustrated in FIG. 1 of PTL 1, carbon nanotubes bridge the gap between only one pair of electrodes having the same structure, and the related carbon nanotube sensor detects a change in resistance between the electrodes caused due to adsorption of gas molecules on the carbon nanotubes, thereby detecting a gas concentration.

The related carbon nanotube sensor is an element having only a pair of electrodes having the same structure, and dielectrophoresis causes the carbon nanotubes to bridge the gap between the only one pair of electrodes having the same structure. Thus, the related carbon nanotube sensor provides an advantage that a bridging process is simple.

CITATION LIST

Patent Literature

PTL 1: Japanese Unexamined Patent Application Publication No. 2006-329802

SUMMARY OF INVENTION

Technical Problem

In the related carbon nanotube sensor, however, the dielectrophoresis causes the carbon nanotubes to bridge the gap between the only one pair of electrodes having the same structure. Therefore, an electrical characteristic, a resistance value, and a detection performance widely vary for individual sensors, and high detection accuracy, a broad detection range, reproducibility, and reliability are not obtained, and the yield is also low.

Specifically, for example, also when the response of the related carbon nanotube sensor to the gas concentration is considered, the response significantly differs between elements as illustrated by curves (a) and (b) in FIG. 16. In FIG. 16, $\Delta G$ represents the variation of conductance, and $G0$ represents an initial conductance in air.

Control of the length, chirality, and bundle state (aggregation state) of carbon nanotubes is difficult, and dielectrophoresis tends to vary the number, length, chirality, and bundle state of the carbon nanotubes aligned and accumulated between the only one pair of electrodes having the same structure. Thus, the detection performance also varies for individual sensors, and it thus becomes difficult to obtain high accuracy, reliability, and reproducibility. Moreover, since the variation in the performance is large, the yield may decrease.

For example, specifically, as illustrated in FIGS. 17A and 17B, when dielectrophoresis causes carbon nanotubes 103, 103, . . . to bridge the gap between only a pair of electrodes 101 and 102 having the same structure, thereby forming a carbon nanotube sensor, the length, bundle state (aggregation state), number, and density of the carbon nanotubes 103, 103, . . . for bridging the gap are different even though carbon nanotube sensors are formed at the same time under the same condition.

Moreover, it is difficult to produce the carbon nanotube with its length, bundle state (aggregation state), and chirality being controlled, and thus, only a mixture of carbon nanotubes in various states is easily available, and arranging the carbon nanotubes in different states is also considered as a cause of variations in the performance.

The cause is not only in a case of carbon nanotubes, but the same is assumed to be applicable also to a case of adopting nanofibers serving as nanoscale fibrous substances including Si nanowires and the like in a narrow sense.

Thus, it is an object of the present invention is to provide a nanofiber sensor which provides high detection accuracy, a wide detection range, reproducibility, and high reliability with a high yield even when an electrical characteristic, a resistance value, and a detection performance widely vary for individual sensors.

Solution to Problem

To achieve the object, a nanofiber sensor of an embodiment of the present invention includes a plurality of pairs of electrodes and a plurality of nanofibers at least one of which bridges a gap between the electrodes in each of the plurality of pairs of electrodes, wherein at least two pairs of electrodes of the plurality of pairs of electrodes are different from each other in structures.

In the specification, a nanofiber means a nanofiber in a broad sense and corresponds to a concept including nanotubes such as carbon nanotubes in addition to solid nanofibers in a narrow sense.

Advantageous Effects of Invention

According to an embodiment of the present invention, it is possible to provide a nanofiber sensor which provides high detection accuracy, wide detection range, reproducibility, and high reliability with a high yield.

DESCRIPTION OF EMBODIMENTS

Figure 1:
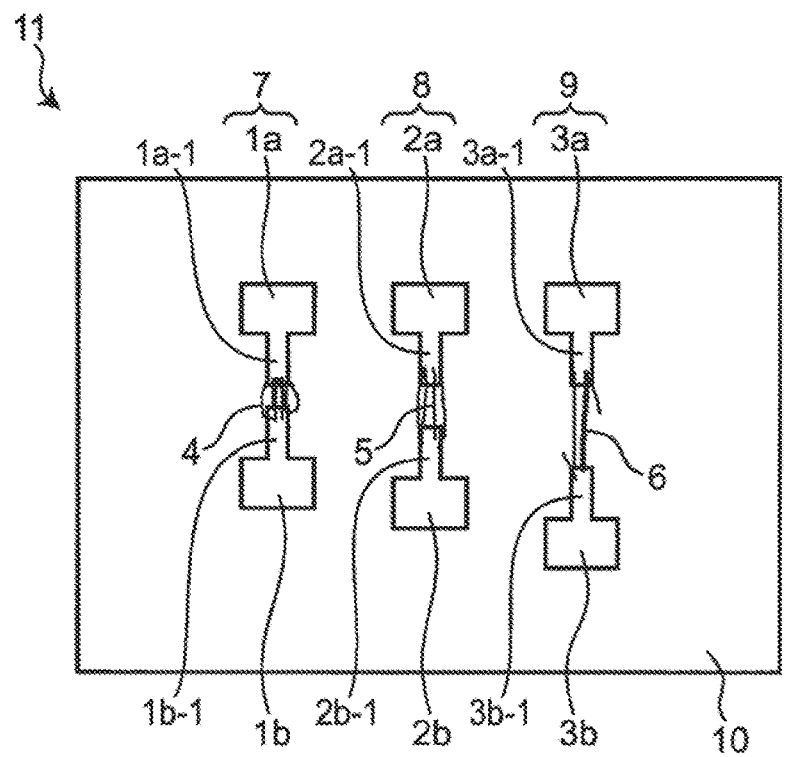
FIG. 1 is a plan view illustrating a carbon nanotube (CNT) sensor of a first embodiment of the present invention.

The present invention will be described in detail below with reference to embodiments illustrated in the drawings.

First Embodiment

FIG. 1 is a plan view illustrating a carbon nanotube sensor 11 as an example of a nanofiber sensor of a first embodiment of the present invention. In the following description, a carbon nanotube is abbreviated as CNT.

As illustrated in FIG. 1, a CNT sensor 11 of the first embodiment includes three CNT elements 7, 8, and 9 formed on an insulating substrate (e.g., glass substrate) 10. The CNT element 7 includes a pair of metal electrodes 1a and 1b and CNTs 4 bridging the gap between the metal electrodes 1a and 1b in the pair. Similarly, the CNT element 8 includes a pair of metal electrodes 2a and 2b and CNTs 5 bridging the gap between the metal electrodes 2a and 2b in the pair. Similarly, the CNT element 9 includes a pair of metal electrodes 3a and 3b and CNTs 6 bridging the gap between the metal electrodes 3a and 3b in the pair.

The metal electrodes 1a, 1b, 2a, 2b, 3a, and 3b are made of, for example, Ti/Au, Au, Ti, Al, etc. The metal electrodes 1a and 1b in the pair respectively have counter sections 1a-1 and 1b-1 which face each other and the gap between which is bridged by the CNTs 4. The metal electrodes 2a and 2b in the pair respectively have counter sections 2a-1 and 2b-1 which face each other and the gap between which is bridged by the CNTs 5. The metal electrodes 3a and 3b in the pair respectively have counter sections 3a-1 and 3b-1 which face each other and the gap between which is bridged by the CNTs 6. The counter sections 1a-1, 1b-1, 2a-1, 2b-1, 3a-1, and 3b-1 each have a rectangular shape with a width of, for example, 1 μm, that is, are all the same in shape.

On the other hand, the gap between the metal electrodes 1a and 1b, the gap between the metal electrodes 2a and 2b, and the gap between the metal electrodes 3a and 3b are, for example, 1 μm, 2 μm, and 4 μm respectively and are different from one another. As described above, the gap between the metal electrodes 1a and 1b in the pair, the gap between the metal electrodes 2a and 2b in the pair, and the gap between the metal electrodes 3a and 3b in the pair, that is, the gap between the counter sections 1a-1 and 1b-1, the gap between the counter sections 2a-1 and 2b-1, and the gap between the counter sections 3a-1 and 3b-1 are respectively 1 μm, 2 μm, and 4 μm and are different, and therefore, as the CNTs 4, 5, and 6 adopted for bridging electrode gaps, CNTs having lengths corresponding to the respective gaps of 1 μm, 2 μm, and 4 μm easily bridge electrode gaps.

In the first embodiment, the three pairs of electrodes 1a and 1b, 2a and 2b, and 3a and 3b are different from one another in the gaps between the electrodes 1a and 1b, between the electrodes 2a and 2b, and between the electrodes 3a and 3b. However, some pairs of metal electrodes may have the same gaps as long as there are two or more types of gaps of the pairs of metal electrodes. That is, the gaps between electrodes of at least two pairs of electrodes of the plurality of pairs of electrodes have to be different from each other. The gaps between electrodes of at least two pairs of electrodes being different from each other is an example that the structures of at least two pairs of electrodes are different from each other.

On the other hand, the CNTs 4, 5, and 6 receive electrons by adsorption of a gas or the like on surfaces thereof, which causes changes in resistance and conductance between the pair of electrodes 1a and 1b, between the pair of electrodes 2a and 2b, and between the pair of electrodes 3a and 3b, and the changes are measured to detect the gas concentration and the like.

The CNTs 4, 5, and 6 may be multi-walled CNTs but preferably include single-walled CNTs and are more preferably semiconductive CNTs. This is because a conductance change is significant and high sensitivity is obtained in the single-walled CNTs and semiconductive CNTs when gas molecules are adsorbed on the surfaces thereof.

Moreover, each one of the CNTs 4, 5, and 6 may bridge electrode gaps, but preferably, a plurality of CNTs are adopted to bridge electrode gaps. It is technically difficult to bridge an electrode gap by only one CNT, and there may be some electrodes which have gaps not being bridged and which thus cannot be measured. Therefore, adopting a plurality of CNTs easily enables electrode gaps to be bridged, which leads to low cost from the point of view of the yield.

Moreover, the CNTs 4, 5, and 6 may be CNTs aggregated in a bundle form (bundle state) or CNTs connected in a length direction thereof.

In FIG. 1, the CNT sensor 11 includes the three CNT elements 7, 8, and 9, but the number of CNT elements may be two, or four or more, and any number of CNT elements may be provided as long as the gaps between electrodes of at least two pairs of electrodes are different from each other.

Figure 2:
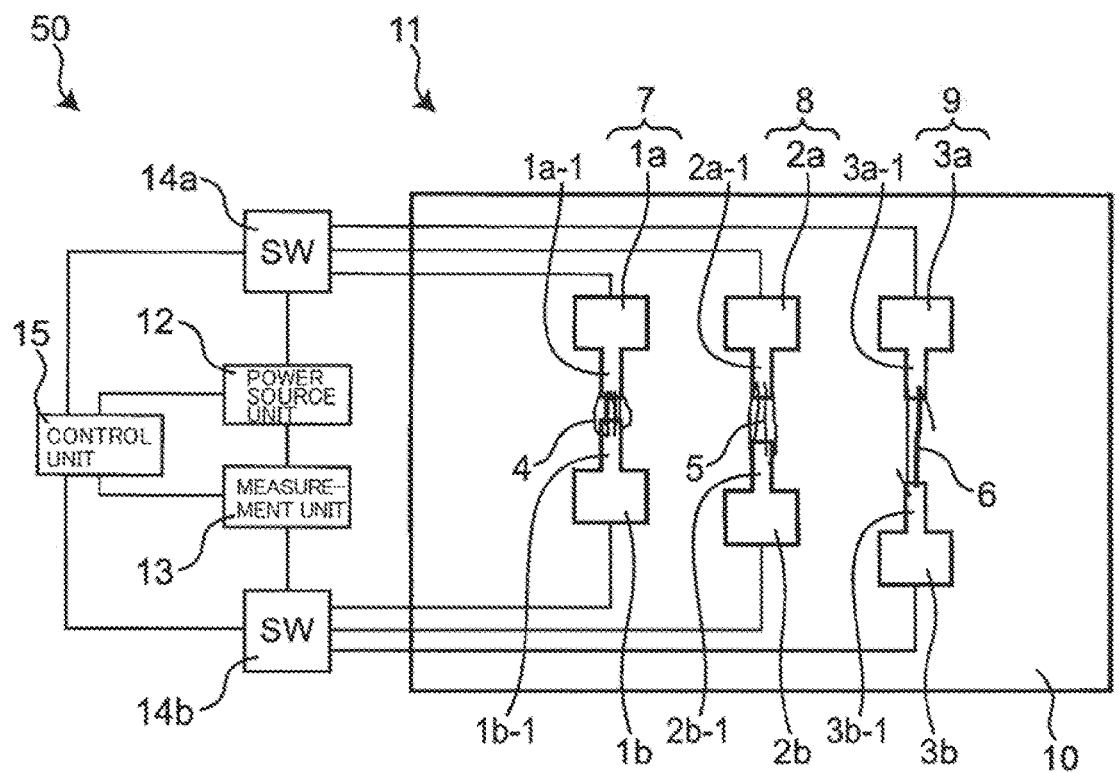
FIG. 2 is a view illustrating the CNT sensor and a detection apparatus of the first embodiment of the present invention.

FIG. 2 is a plan view illustrating the CNT sensor 11 and a detection apparatus 50.

The detection apparatus 50 includes a power source unit 12 configured to apply a voltage to the CNT elements 7, 8, and 9, a measurement unit 13 configured to measure electrical characteristics of the CNT elements 7, 8, and 9, switches 14a and 14b configured to switch the CNT elements 7, 8, and 9 to which the voltage is to be applied and which are to be measured, and a control unit 15 including a CPU or the like configured to control the power source unit 12, the measurement unit 13, and the switches 14a and 14b to perform computation.

A conductance change of each of the CNT elements 7, 8, and 9 is measured by the detection apparatus 50, and each piece of data of the plurality of CNT elements 7, 8, and 9 is selected to perform the computation to reduce the influence of variations of the characteristics of the CNTs 4, 5, and 6, which enables the type and the concentration of, for example, a gas to be detected with high accuracy.

Next, with reference to FIGS. 3A, 3B, 3C, and 3D, a method for fabricating the CNT sensor 11 will be described.

First, although not shown, single-walled CNTs (carbon nanotubes) each exhibiting semiconduction, having a diameter of 1 nm to 3 nm are added to 2-propanol (IPA) as a solvent and are subjected to ultrasonic vibration for dispersion so as to prepare a CNT dispersion solution. In order to disperse the CNTs in the IPA, a small amount of surfactant may be added, or the solvent may be other organic solvents such as acetone and the like or may be pure water. The concentration of the CNTs is 0.1 µg/ml.

Figure 3A:
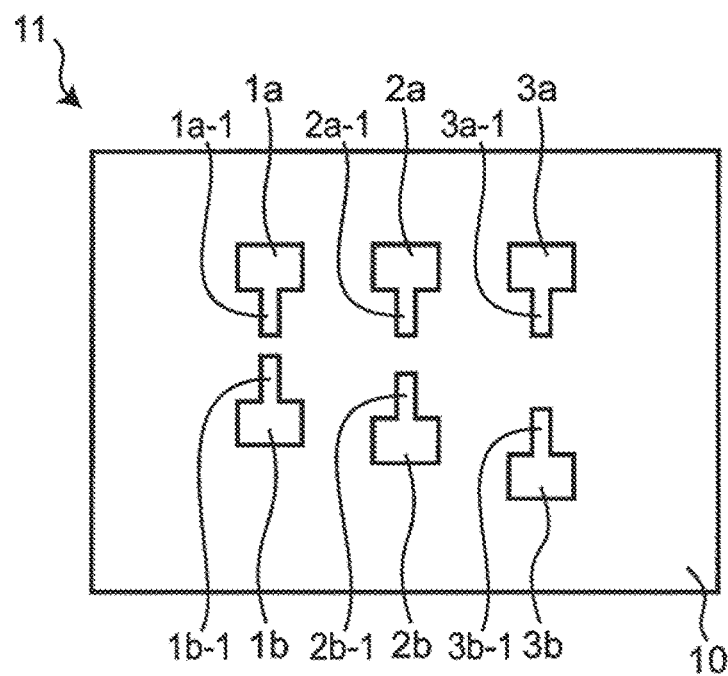
FIG. 3A is a view illustrating a method for fabricating the CNT sensor of the first embodiment of the present invention.

Next, as illustrated in FIG. 3A, the pairs of metal electrodes 1a and 1b, 2a and 2b, and 3a and 3b made of Ti/Au are formed on the insulating substrate (for example, glass substrate) 10 by sputtering or vapor deposition. The metal electrodes 1a and 1b in the pair are elongated in a direction in which they face each other, the metal electrodes 2a and 2b in the pair are elongated in a direction in which they face each other, and the metal electrodes 3a and 3b in the pair are elongated in a direction in which they face each other, wherein tip sections facing each other, that is, the counter sections 1a-1 and 1b-1, 2a-1 and 2b-1, and 3a-1 and 3b-1 each have a rectangular shape with a width of, for example, 1 µm and have electrode gaps of 1 µm, 2 µm, and 4 µm respectively.

Figure 3B:
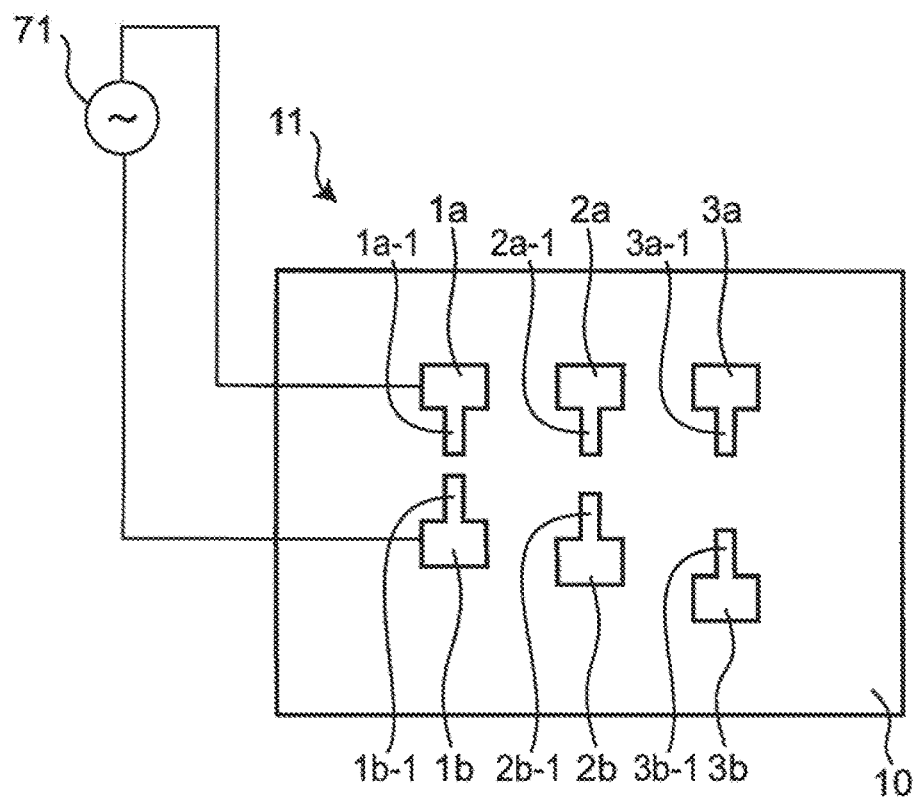
FIG. 3B is a view illustrating a method for fabricating the CNT sensor of the first embodiment of the present invention.

Next, as illustrated in FIG. 3B, an alternating-current power supply 71 is connected to apply an alternating-current voltage between the electrodes 1a and 1b in one pair. The alternating-current voltage has a sine wave of 2 Vpp at a frequency of 100 kHz. In a state where the alternating-current voltage is applied, the substrate 10 is immersed in the CNT dispersion solution for 10 seconds. Application of the alternating-current voltage generates a nonuniform electric field at the tip sections of the pair of metal electrodes 1a and 1b facing each other, that is, at the counter sections 1a-1 and 1b-1, and both ends of the CNTs which are not shown are polarized, and thereby, the CNTs are attracted to the counter sections 1a-1 and 1b-1 of the pair of metal electrodes 1a and 1b, and dielectrophoresis occurs. The dielectrophoresis enables the CNTs to be arranged and accumulated on surfaces of the counter sections 1a-1 and 1b-1 of the pair of metal electrodes 1a and 1b along a direction of an electric field connecting the counter sections 1a-1 and 1b-1, and thereby, the CNTs bridge the gap between the counter sections 1a-1 and 1b-1 of the pair of metal electrodes 1a and 1b.

Figure 3C:
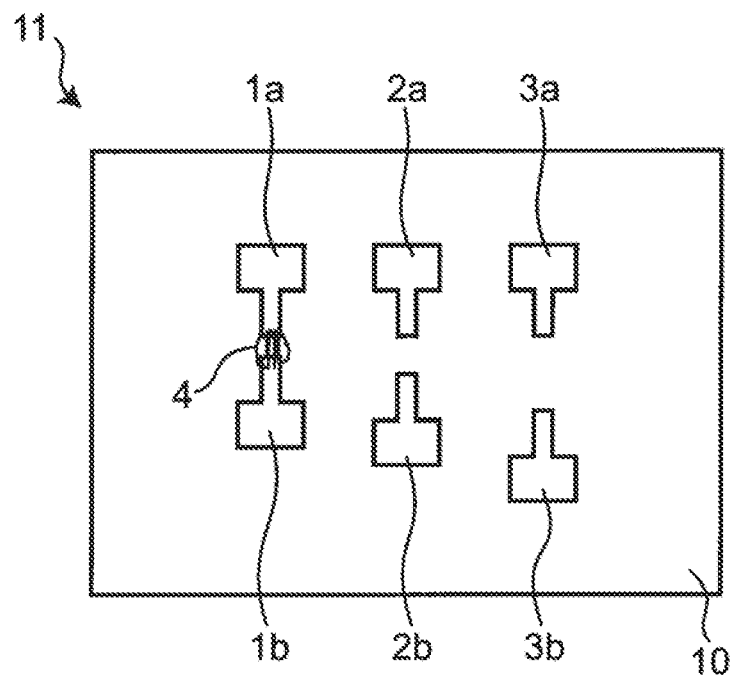
FIG. 3C is a view illustrating a method for fabricating the CNT sensor of the first embodiment of the present invention.

Next, as illustrated in FIG. 3C, the substrate 10 is taken out of the CNT dispersion solution, and the solvent is evaporated to fix the CNTs 4 to the pair of metal electrodes 1a and 1b and the substrate 10.

Figure 3D:
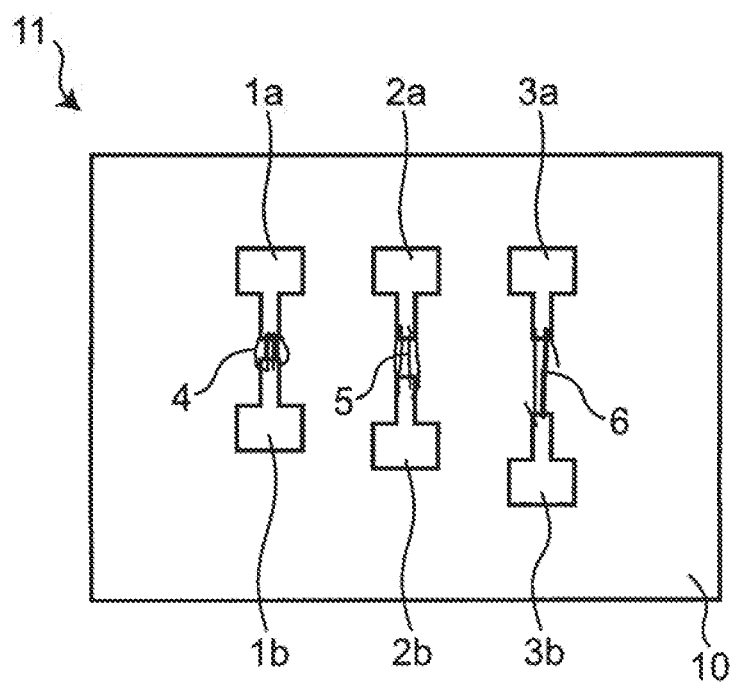
FIG. 3D is a view illustrating a method for fabricating the CNT sensor of the first embodiment of the present invention.

Next, as illustrated in FIG. 3D, the alternating-current power supply 71 shown in FIG. 3B is connected between the pair of metal electrodes 2a and 2b to fix the CNTs 5 thereto in a similar manner, and moreover, the alternating-current power supply 71 shown in FIG. 3B is connected between the pair of metal electrodes 3a and 3b to fix the CNTs 6 thereto in a similar manner.

The alternating-current voltage and the frequency applied to the pairs of metal electrodes 1a and 1b, 2a and 2b, and 3a and 3b and/or an immersion time of the substrate 10 in the CNT dispersion solution may be the same or may be changed individually during the dielectrophoresis. When the alternating-current voltage applied to the pairs of metal electrodes 1a and 1b, 2a and 2b, and 3a and 3b and/or an immersion time of the substrate 10 in the CNT dispersion solution are set for the pairs of electrodes 1a and 1b, 2a and 2b, and 3a and 3b individually during the dielectrophoresis, it is also possible to adjust the concentration and the number of CNTs for bridging electrode gaps. This easily enables significant changes in the characteristics of the CNT elements 7, 8, and 9.

The CNTs may be directly grown on the metal electrodes 1a, 1b, 2a, 2b, 3a, and 3b by chemical vapor deposition (CVD), or the CNT dispersion solution may be directly dropped onto the pairs of metal electrodes 1a and 1b, 2a and 2b, and 3a and 3b, and the solvent may be evaporated to accumulate the CNTs, but the CNTs are preferably accumulated by the dielectrophoresis. This is because the dielectrophoresis easily adjusts lengths and orientations of the CNTs bridging the gap between the pair of metal electrodes 1a and 1b, the CNTs bridging the gap between the pair of metal electrodes 2a and 2b, and the CNTs bridging the gap between the pair of metal electrodes 3a and 3b.

Figure 4:
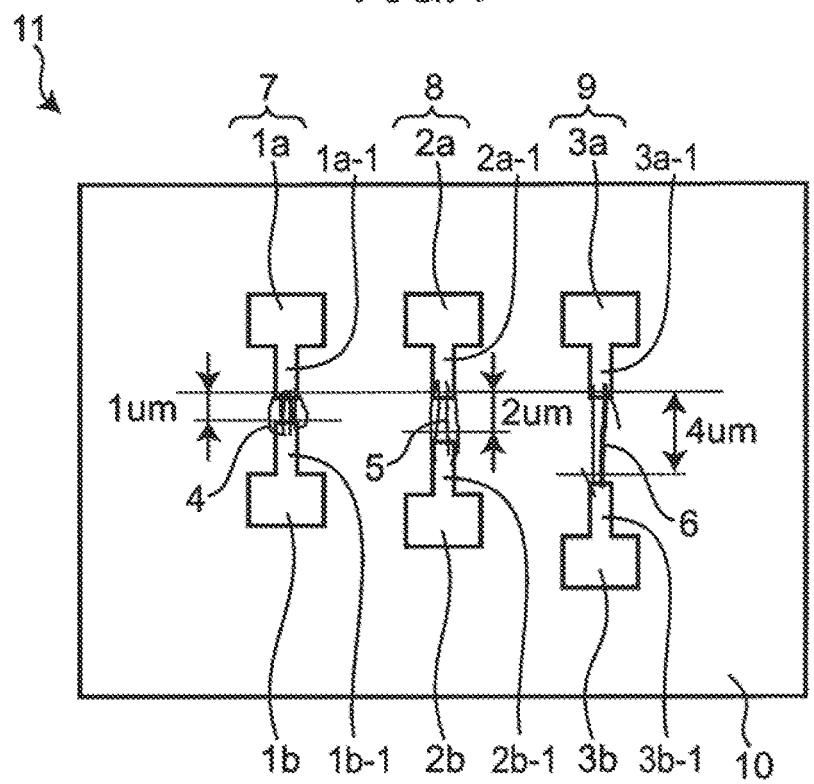
FIG. 4 is a view illustrating a feature of the CNT sensor of the first embodiment of the present invention.

According to the CNT sensor 11 having the above-described configuration, as illustrated in FIG. 4, the electrode gaps of the pairs of metal electrodes 1a and 1b, 2a and 2b, and 3a and 3b of the CNT elements 7, 8, and 9 are respectively 1 µm, 2 µm, and 4 µm and are different from one another, and therefore, as the CNTs 4, 5, and 6 for bridging electrode gaps, the number of CNTs having lengths according to the electrode gaps increases. For example, in the CNT element 9 whose electrode gap is 4 µm, one ends of CNTs having a short length of 1 µm are accumulated on one electrode 3a or 3b, but the CNTs do not bridge the gap between the two electrodes 3a and 3b, and therefore, the CNTs having a short length of 1 µm do not operate. Thus, the CNT element 9 provides an element characteristic corresponding to the CNT 6 having a length corresponding to the electrode gap of 4 µm. The same applies to the CNT elements 7 and 8.

Figure 5:
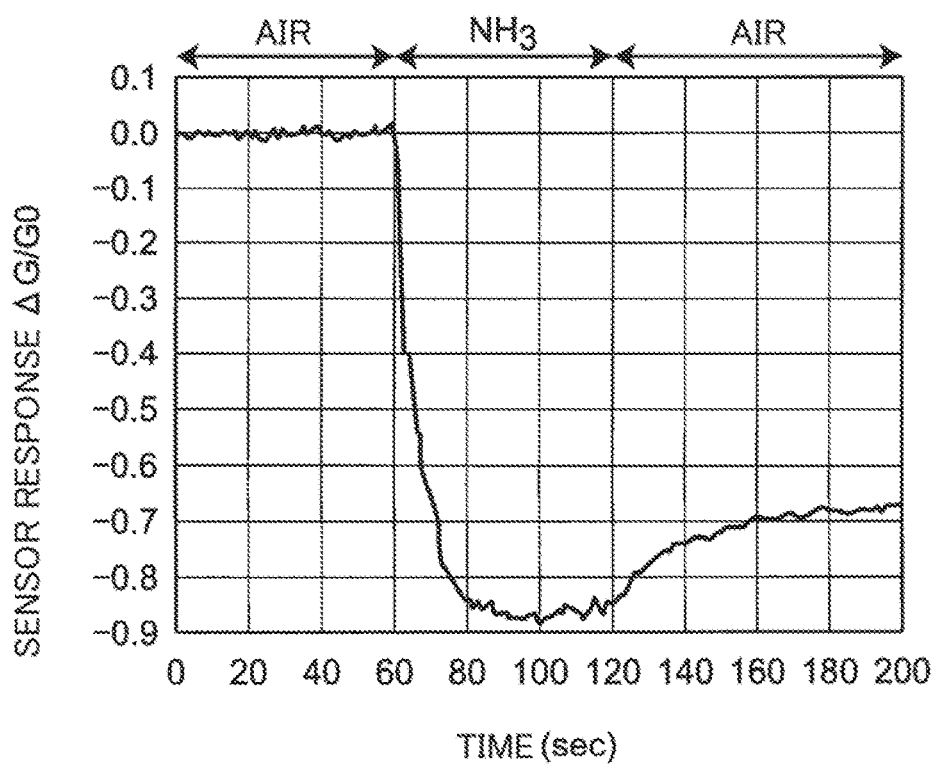
FIG. 5 is a graph illustrating a sensor response of the CNT sensor of the first embodiment of the present invention in a gas.

FIG. 5 is a response diagram illustrating a sensor response which is a change in conductance in a $NH_3$ gas having a concentration of 100 ppm for the CNT element 8 whose gap between the pair of electrodes 2a and 2b is 2 µm. The sensor response is a degree of change ΔG in conductance normalized by an initial conductance G0 in air. As can be seen from FIG. 5, when the CNT element 8 is exposed to the $NH_3$ gas, the conductance rapidly decreases. Then, air is introduced, which gradually increases the conductance. $NH_3$ is a reducing gas, and therefore, when the $NH_3$ is adsorbed on a CNT surface, electrons move from NH$_3$ molecules to the CNTs, which reduces the hole density of the CNT surface, thereby reducing the conductance.

Figure 6:
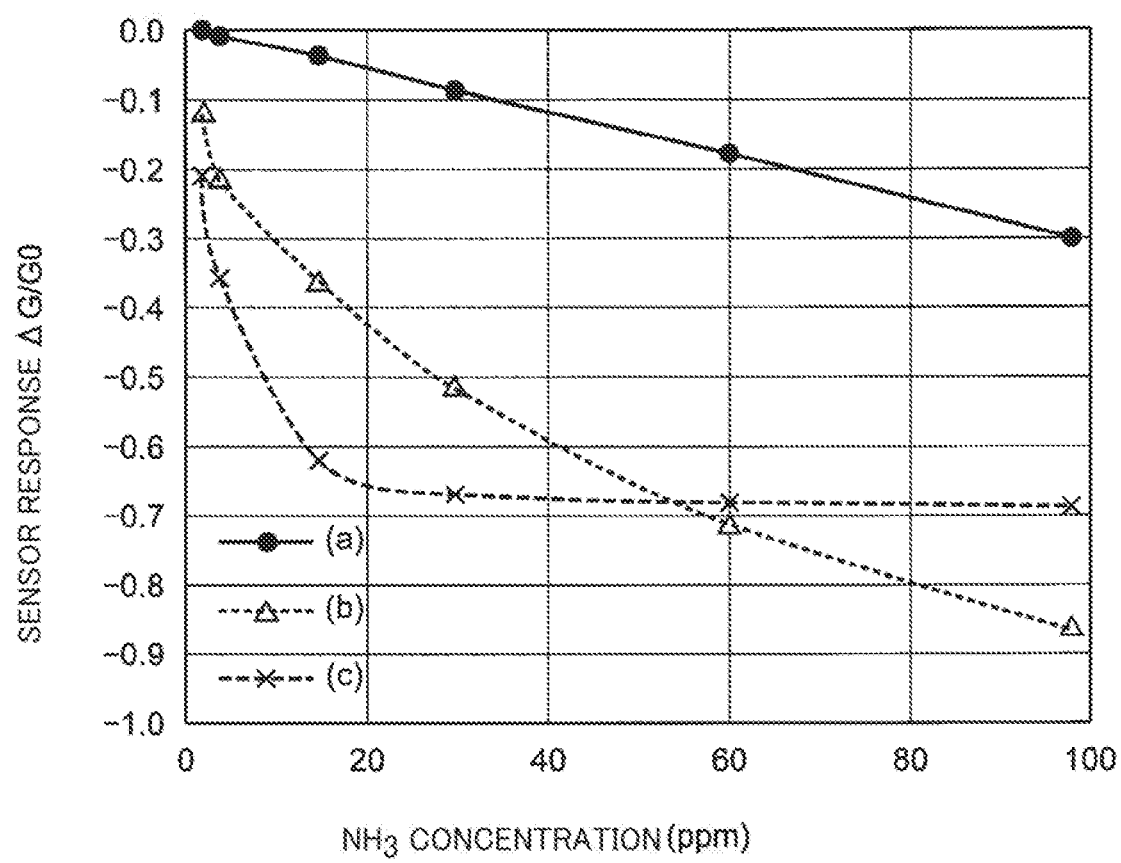
FIG. 6 is a graph illustrating a relationship between a $NH_3$ concentration of each CNT element of the CNT sensor and the sensor response of the first embodiment of the present invention.

FIG. 6 is a graph of an example illustrating sensor response characteristics of the CNT elements 7, 8, and 9 of FIG. 1 to the NH$_3$ gas concentration, wherein the CNT elements 7, 8, and 9 respectively correspond to curves (a), (b), and (c) in FIG. 6. The response characteristic to the concentration significantly differs among the CNT elements 7, 8, and 9.

As illustrated in FIG. 6, the CNT element 7 has a small sensor response in a region in which the NH$_3$ concentration is low, that is, less than or equal to 30 ppm, and thus, the NH$_3$ concentration cannot be calculated with high accuracy, but when the NH$_3$ concentration is higher than or equal to 30 ppm, the sensor response is large, and the NH$_3$ concentration can be calculated with high accuracy. Moreover, the CNT element 8 exhibits a large sensor response up to an NH$_3$ concentration of 100 ppm. Moreover, the CNT element 9 has a large change of the response to the NH$_3$ concentration in a region smaller than or equal to 20 ppm, and the NH$_3$ concentration can be calculated accurately, but when the NH$_3$ concentration is higher than or equal to 20 ppm, the change of the sensor response is saturated, and the NH$_3$ concentration cannot be calculated accurately.

As described above, even when the characteristic of the sensor response is different depending on the CNT elements 7, 8, and 9, using the plurality of CNT elements 7, 8, and 9 enables calculation of the NH$_3$ concentration in a wide range, and it is possible to reduce measurement errors as compared to a case where measurement is performed by only one CNT element.

In the CNT sensor 11, dielectrophoresis enables the CNTs 4, 5, 6 to respectively bridge the gaps between the pair of electrodes 1a and 1b, between the pair of electrodes 2a and 2b, and between the pairs of electrodes 3a and 3b formed on the identical substrate 10 and having different electrode gaps, and thus, the CNT sensor 11 can be downsized.

Moreover, the CNT sensor 11 includes the CNT elements 7, 8, and 9 including the pairs of electrodes 1a and 1b, 2a and 2b, and 3a and 3b having different electrode gaps, and therefore, even when the length and the state of the plurality of CNTs 4, 5, and 6 for bridging electrode gaps are different, it is possible to detect a gas and the like with high accuracy.

The NH$_3$ gas has been described above, but the NH$_3$ gas does not intend to be limiting, and it is possible to detect a gas of NO$_2$ or an organic substance such as acetone in a similar manner. In a case of an oxidating gas such as an NO$_2$ gas, the hole density of the CNT surface increases, and a response that the conductance increases is shown.

Second Embodiment

Figure 7:
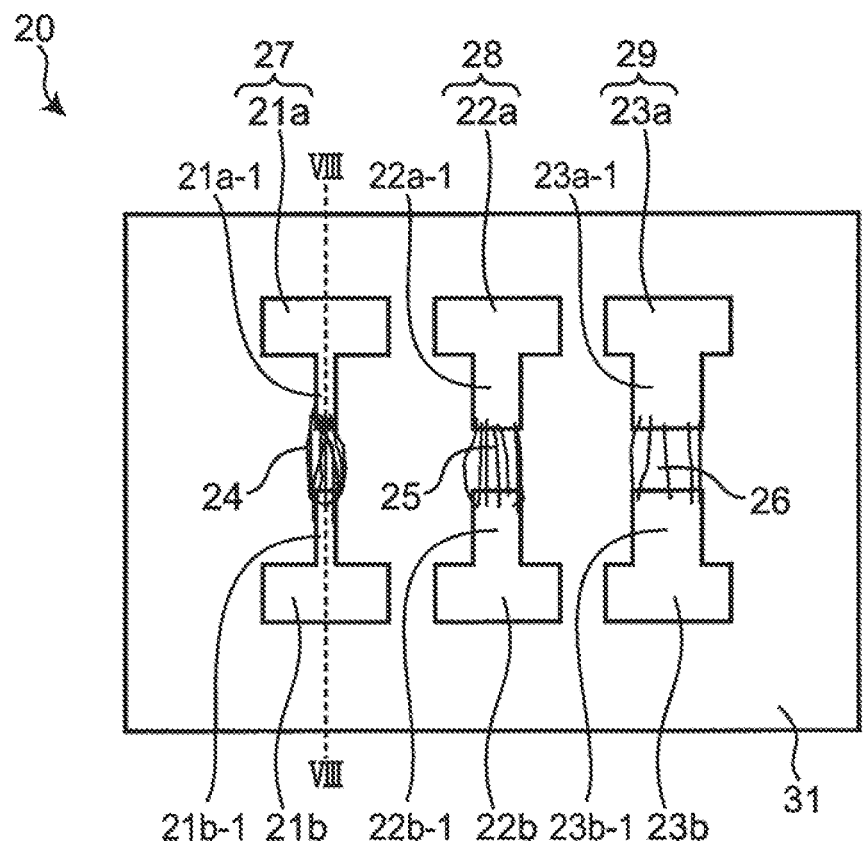
FIG. 7 is a plan view illustrating a CNT sensor of a second embodiment of the present invention.
Figure 8:
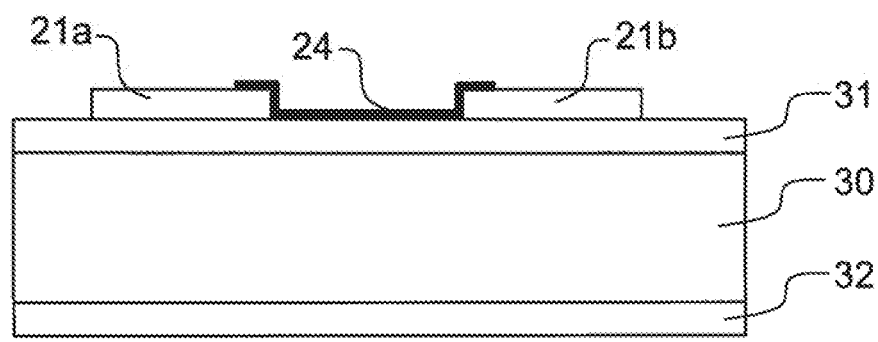
FIG. 8 is a sectional view along line VIII-VIII of FIG. 7.

FIG. 7 is a plan view illustrating a CNT sensor 20 of a second embodiment of the present invention. FIG. 8 is a sectional view along line VIII-VIII of FIG. 7.

First, main differences between the CNT sensor 20 of the second embodiment and the CNT sensor 11 of the first embodiment are as follows.

In the first embodiment, the gaps between the electrodes of the pairs of electrodes are different from one another, whereas in the second embodiment, gaps between electrodes of pairs of electrodes are the same, and widths of counter sections facing each other of the pairs of electrodes are different from one another.

In the second embodiment, a conductive Si substrate having a surface provided with an insulation film (SiO$_2$ film) and a back surface provided with a back gate electrode is prepared, and the pairs of electrodes are formed on the SiO$_2$ film which is an insulation film, and CNTs bridge the gap between the electrodes in each pair.

In the second embodiment, a CNT element has an FET structure having a back gate structure.

As illustrated in FIG. 8, an insulation film 31 made of SiO$_2$ is formed on a surface of a conductive Si substrate 30, and a metal electrode 32 is formed on a back surface of the conductive Si substrate 30.

As illustrated in FIGS. 7 and 8, three CNT elements 27, 28, and 29 are formed on the insulation film 31 on the conductive Si substrate 30. The CNT element 27 includes a pair of metal electrodes 21a and 21b and CNTs 24 bridging the gap between the metal electrodes 21a and 21b in the pair. Similarly, the CNT element 28 includes a pair of metal electrodes 22a and 22b and CNTs 25 bridging the gap between the metal electrodes 22a and 22b in the pair. Similarly, the CNT element 29 includes a pair of metal electrodes 23a and 23b and CNTs 26 bridging the gap between the metal electrodes 23a and 23b in the pair.

The metal electrodes 21a, 21b, 22a, 22b, 23a, and 23b are made of, for example, Ti/Au, and the metal electrode 32 on the back surface of the conductive Si substrate 30 is made of, for example, Al.

The metal electrodes 21a and 21b in the pair of the CNT element 27 respectively have counter sections 21a-1 and 21b-1 which face each other and the gap between which is bridged by the CNTs 24. The metal electrodes 22a and 22b in the pair of the CNT element 28 respectively have counter sections 22a-1 and 22b-1 which face each other and the gap between which is bridged by the CNTs 25. The metal electrodes 23a and 23b in the pair of the CNT element 29 respectively have counter sections 23a-1 and 23b-1 which face each other and the gap between which is bridged by the CNTs 26. The counter sections 21a-1 and 21b-1 each has a width of 1 μm. The counter sections 22a-1 and 22b-1 each has a width of 2 μm. The counter sections 23a-1 and 23b-1 each has a width of 4 μm. The counter sections 21a-1 and 21b-1 the gap between which is bridged by the CNTs 24, the counter sections 22a-1 and 22b-1 the gap between which is bridged by the CNTs 25, and the counter sections 23a-1 and 23b-1 the gap between which is bridged by the CNTs 26 each have a rectangular shape.

Moreover, the gaps between the electrodes 21a and 21b in the pair, between the electrodes 22a and 22b in the pair, and between the electrodes 23a and 23b in the pair, that is, the gaps between the counter sections 21a-1 and 21b-1 facing each other, between the counter sections 22a-1 and 22b-1 facing each other, and between the counter sections 23a-1 and 23b-1 facing each other are each, for example, 2 μm and are all the same.

As described above, the width of each of the counter sections 21a-1 and 21b-1 facing each other of the pair of metal electrodes 21a and 21b of the CNT element 27, the width of each of the counter sections 22a-1 and 22b-1 facing each other of the pair of metal electrodes 22a and 22b of the CNT element 28, and the width of each of the counter sections 23a-1 and 23b-1 facing each other of the pair of metal electrodes 23a and 23b of the CNT element 29 are different from one another, and therefore, it is possible to change the density and the number of the CNTs 24, 25, and 26 for bridging electrode gaps. Thus, it is easy to significantly change the characteristics of the CNT elements 27, 28, and 29.

In the second embodiment, the three pairs of electrodes 21a and 21b, 22a and 22b, and 23a and 23b are configured such that the width of each of the counter sections 21a-1 and 21b-1 facing each other of the electrodes 21a and 21b, the width of each of the counter sections 22a-1 and 22b-1 facing each other of the electrodes 22a and 22b, and the width of each of the counter sections 23a-1 and 23b-1 facing each other of the electrodes 23a and 23b are different from one another, but some pairs of metal electrodes may have the same widths as long as there are two or more types of widths. That is, the widths of counter sections facing each other of electrodes of at least two pairs of electrodes of the plurality of pairs of electrodes have to be different from each other. The widths of counter sections facing each other of electrodes of at least two pairs of electrodes being different from each other is an example that the structures of at least two pairs of electrodes are different from each other.

On the other hand, the CNT elements 27, 28, and 29 operate as field effect transistors (FETs), wherein one of the electrodes 21a and 21b in the pair, one of the electrodes 22a and 22b in the pair, and one of the electrodes 23a and 23b and the pair are source electrodes, the other of the electrodes 21a and 21b in the pair, the other of the electrodes 22a and 22b in the pair, and the other of the electrodes 23a and 23b in the pair are drain electrodes, the conductive Si substrate 30 and the metal electrode 32 serve as a gate electrode, the insulation film 31 is the gate insulation film, and the CNTs 24, 25, and 26 are channels. When the potential of the gate electrode changes, the carrier concentration of the channels formed by the CNTs 24, 25, and 26 is changed, and it is possible to change the current and the conductance, and adsorption of a gas and the like on the surfaces of the CNTs 24, 25, and 26 also enables electrons to be transferred, thereby changing the current and the conductance. The voltage of the conductive Si substrate 30 and the metal electrode 32 serving as the gate electrode, that is, a gate voltage enables detection sensitivity to be changed. Therefore, it is possible to detect the gas concentration and the like with higher sensitivity and higher accuracy than the CNT elements 7, 8, and 9 having two terminals shown in the first embodiment.

Figure 9:
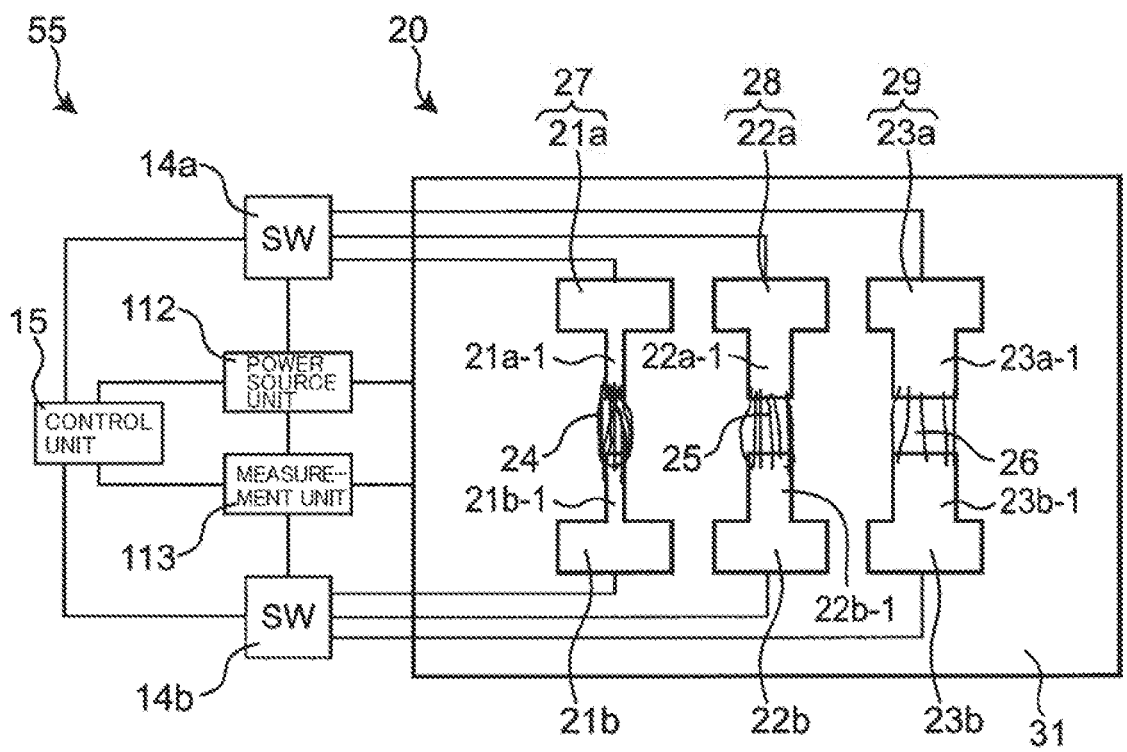
FIG. 9 is a view illustrating the CNT sensor and a detection apparatus of the second embodiment of the present invention.

FIG. 9 is a plan view illustrating the CNT sensor 20 and a detection apparatus 55.

The detection apparatus 55 is different from the detection apparatus 50 of the first embodiment shown in FIG. 2 only in that a power source unit 112 and a measurement unit 113 are connected to the metal electrode 32 serving as the gate electrode shown in FIG. 8. Thus, of components in the detection apparatus 55 of the second embodiment, components the same as the components in the detector 50 of the first embodiment shown in FIG. 2 are denoted by the same reference numbers as those in the first embodiment, and the detailed description thereof is omitted.

A control unit 15 controls the power source unit 112, the measurement unit 113, and switches 14a and 14b, measures a conductance change of each of the CNT elements 27, 28, and 29, and selects each piece of data of the plurality of CNT elements 27, 28, and 29 to perform computation, which enables the type and the concentration of, for example, a gas to be detected with high accuracy.

Moreover, each of the CNT elements 27, 28, and 29 has a FET structure and adjusts the gate voltage to enable the detection sensitivity to be changed, and therefore, setting an appropriate gate voltage enables the type and the concentration of a gas to be detected with further high accuracy.

Next, with reference to FIG. 10 and FIGS. 11A, 11B, 11C, and 11D, a method for fabricating the CNT sensor 20 will be described.

The method for fabricating the CNT sensor 20 of the second embodiment is different from the method for fabricating the CNT sensor 11 of the first embodiment in the following points.

A conductive Si substrate having a surface provided with an insulation film ($SiO_2$ film) and a back surface provided with a back gate electrode is prepared, and the pairs of electrodes are formed on the $SiO_2$ film which is an insulation film, and CNTs bridge the gap between the electrodes in each pair.

The CNTs are accumulated by one time of dielectrophoresis, and then, the electrodes are separated.

First, a CNT dispersion solution exactly the same as that in the first embodiment is prepared.

Figure 10:
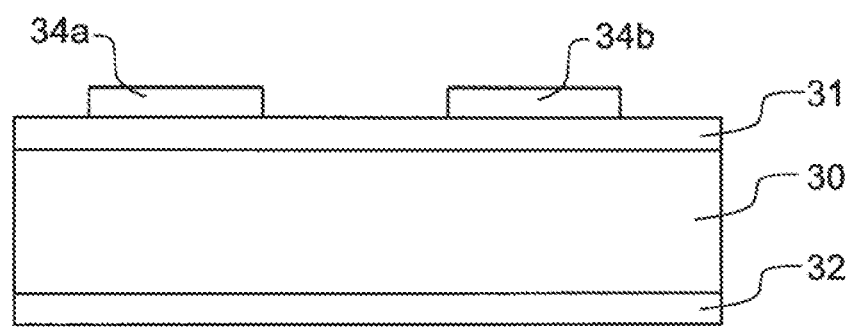
FIG. 10 is a view illustrating a method for fabricating the CNT sensor of the second embodiment of the present invention.

Then, as illustrated in FIG. 10, an insulation film 31 made of $SiO_2$ is formed on one surface of a p-type conductive Si substrate 30 to have a thickness of 100 nm by thermal oxidation. Next, the metal electrode 32 made of Al is deposited overall on the other surface of the p-type conductive Si substrate 30.

Note that the insulation film 31 is not limited to the $SiO_2$ film but may be a SiN film or the like. Moreover, the insulation film 31 may be formed by plasma CVD or sputtering. The conductivity of the Si substrate 30 may be n-type.

Figure 11A:
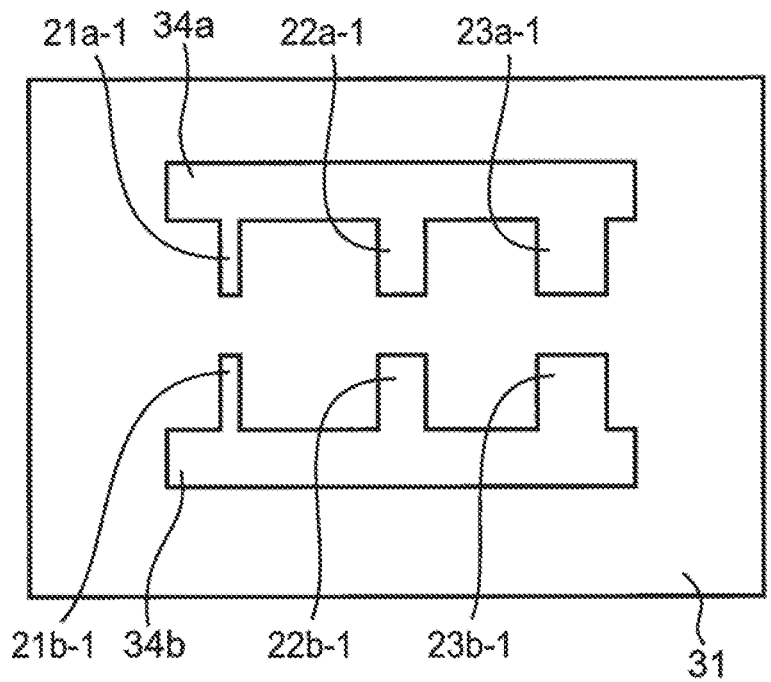
FIG. 11A is a view illustrating a method for fabricating the CNT sensor of the second embodiment of the present invention.

Next, as illustrated in FIGS. 10 and 11A, comb-teeth electrodes 34a and 34b made of Ti/Au are formed on the insulation film 31 by sputtering or vapor deposition. The comb-teeth electrodes 34a and 34b respectively have projection sections 21a-1, 22a-1, and 23a-1 and projection sections 21b-1, 22b-1, and 23b-1 on sides facing each other of the comb-teeth electrodes 34a and 34b. Each of the projection sections 21a-1, 21b-1, 22a-1, 22b-1, 23a-1, and 23b-1 has a rectangular shape. The widths of the projection sections corresponding to teeth of the comb-teeth shape, that is, the width of each of the counter sections 21a-1 and 21b-1, the width of each of the counter sections 22a-1 and 22b-1, and the width of each of the counter sections 23a-1 and 23b-1 are respectively 1 µm, 2 µm, and 4 µm and are different from one another. Moreover, the gap between the comb-teeth electrodes 34a and 34b facing each other, that is, the gap between the counter sections 21a-1 and 21b-1, the gap between the counter sections 22a-1 and 22b-1, and the gap between the counter sections 23a-1 and 23b-1 are each 2 µm and are all the same.

Figure 11B:
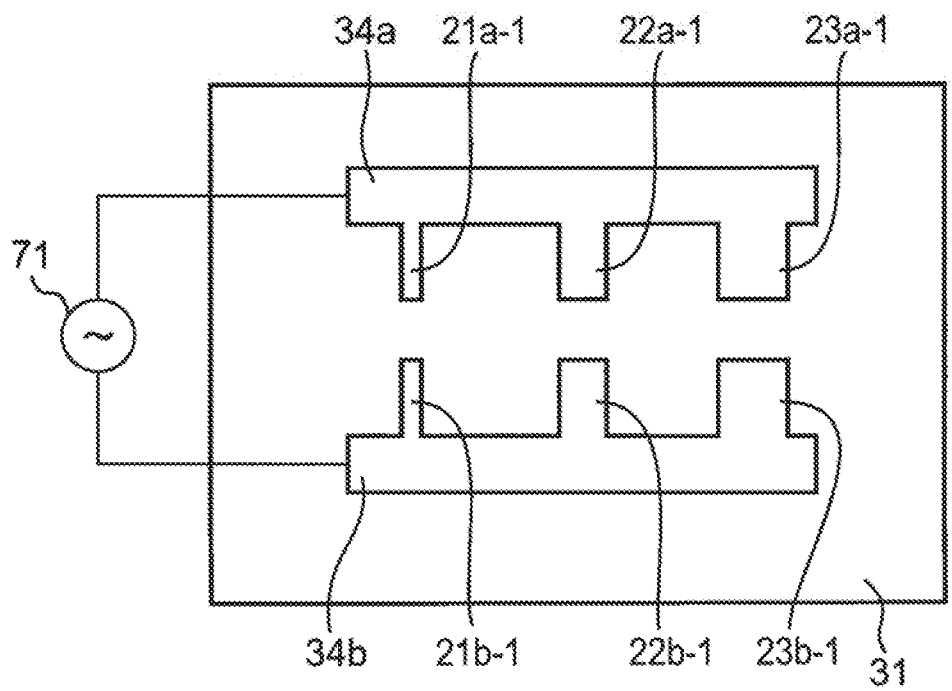
FIG. 11B is a view illustrating a method for fabricating the CNT sensor of the second embodiment of the present invention.
Figure 11C:
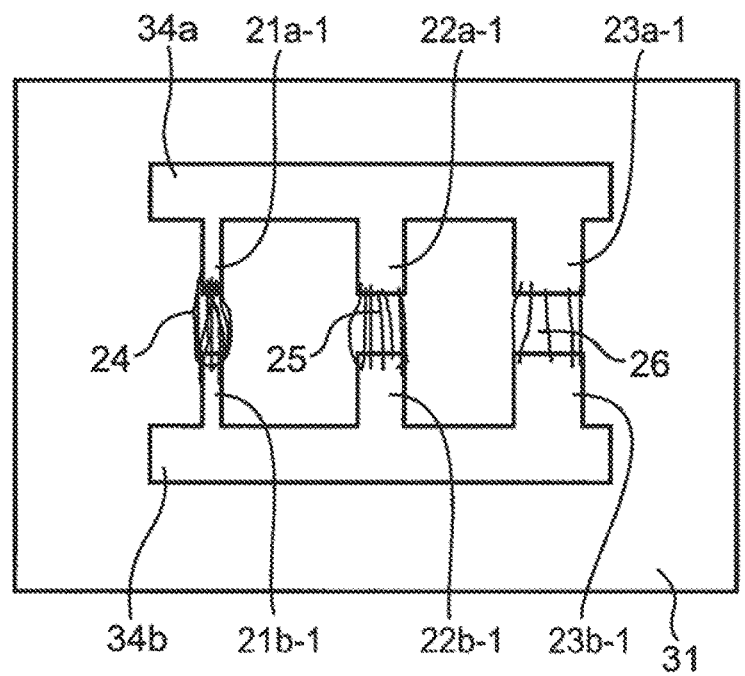
FIG. 11C is a view illustrating a method for fabricating the CNT sensor of the second embodiment of the present invention.

Next, as illustrated in FIG. 11B, an alternating-current power supply 71 is connected to apply an alternating-current voltage between the comb-teeth electrodes 34a and 34b. The alternating-current voltage has a sine wave of 4 Vpp at a frequency of 1 MHz. In a state where the alternating-current voltage is applied, the substrate 30 is immersed in the CNT dispersion solution for 10 seconds. Application of the alternating-current voltage generates nonuniform electric fields at teeth portions facing each other of the comb-teeth electrodes 34a and 34b, that is, at tips of the counter sections 21a-1 and 21b-1, the counter sections 22a-1 and 22b-1, and the counter sections 23a-1 and 23b-1, and both ends of each of the CNTs which are not shown are polarized, thereby the CNTs are attracted to the teeth portions facing each other of the comb-teeth electrodes 34a and 34b, that is, at the tips of the counter sections 21a-1 and 21b-1, the counter sections 22a-1 and 22b-1, and the counter sections 23a-1 and 23b-1. The dielectrophoresis enables the CNTs 24, 25, and 26 to be arranged and accumulated along a direction of electric fields connecting the counter sections 21a-1 and 21b-1 facing each other, the counter sections 22a-1 and 22b-1 facing each other, and the counter sections 23a-1 and 23b-1 facing each other as illustrated in FIG. 11C, and thereby the CNTs 24, 25, and 26 bridge the corresponding gaps between the counter sections at the same time.

The dielectrophoresis exerts larger dielectrophoretic force with a larger electric field concentration, and therefore, the CNTs 24, 25, and 26 are more likely to be accumulated there. Thus, the electric field concentrates more at the electrode having a smaller width, and therefore, the CNTs 24, 25, and 26 are accumulated at a high density. Changing the widths of the teeth portions, that is, of the counter sections 21a-1 and 21b-1, 22a-1 and 22b-1, and 23a-1 and 23b-1 enables the density and the number of CNTs to be varied.

Next, the substrate 10 is taken out of the CNT dispersion solution, and the solvent is evaporated, thereby fixing the CNTs 24, 25, and 26 to the comb-teeth electrodes 34a and 34b and the insulation film 31.

Figure 11D:
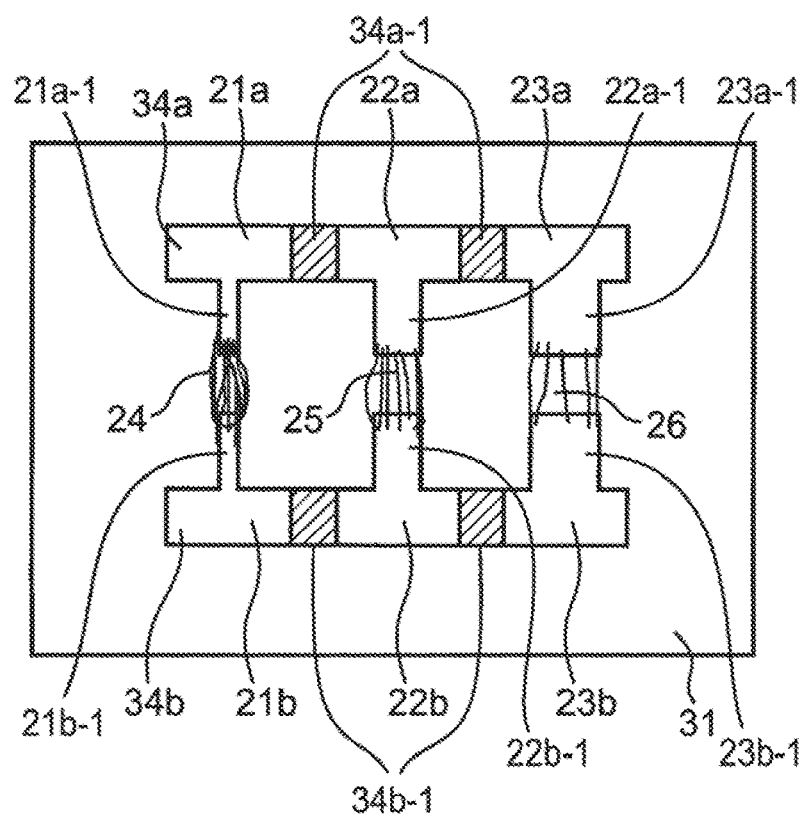
FIG. 11D is a view illustrating a method for fabricating the CNT sensor of the second embodiment of the present invention.

Next, as illustrated in FIG. 11D, hatched areas 34a-1 and 34b-1 of the comb-teeth electrodes 34a and 34b are removed by ion milling, dry etching, or wet etching, and thereby, the electrodes 21a, 22a, 23a are separated, and the electrodes 21b, 22b, and 23b are separated so as to produce the CNT sensor 20 shown in FIG. 7.

Note that the gap between the counter sections 21a-1 and 21b-1 of the pair of metal electrodes 21a and 21b of the CNT elements 27, the gap between the counter sections 22a-1 and 22b-1 of the pair of metal electrodes 22a and 22b of the CNT elements 28, the gap between the counter sections 23a-1 and 23b-1 of the pair of metal electrodes 23a and 23b of the CNT elements 29 of the CNT sensor 20 of the second embodiment shown in FIG. 7 are each 2 µm and are all the same but may be different from one another although not shown in the drawings.

Figure 12:
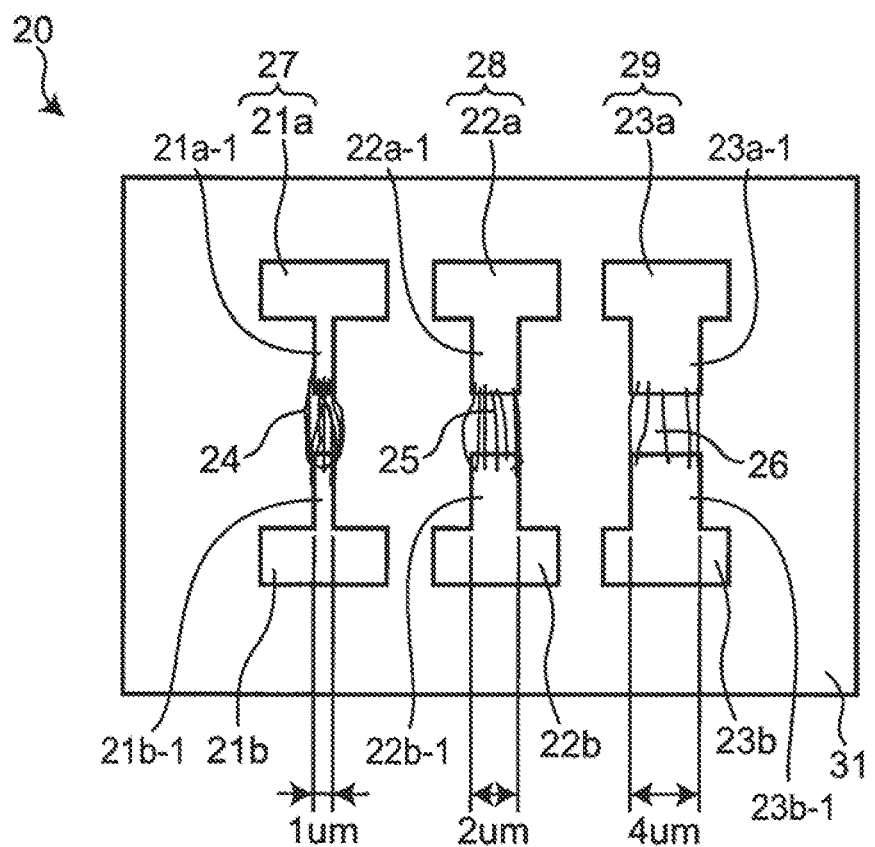
FIG. 12 is a view illustrating a feature of the CNT sensor of the second embodiment of the present invention.

According to the sensor 20 having the above-described configuration, as illustrated in FIG. 12, the width of each of the counter sections 21a-1 and 21b-1 facing each other of the pair of metal electrodes 21a and 21b of the CNT element 27, the width of each of the counter sections 22a-1 and 22b-1 facing each other of the pair of metal electrodes 22a and 22b of the CNT element 28, the width of each of the counter sections 23a-1 and 23b-1 facing each other of the pair of metal electrodes 23a and 23b of the CNT element 29 are respectively, for example, 1 µm, 2 µm, and 4 µm and are different from one another, and therefore, it is possible to change the density and the number of the CNTs 24, 25, and 26 bridging electrode gaps. When the CNT elements 27, 28, and 29 are formed by dielectrophoresis, larger dielectrophoretic force is exerted on the CNTs 24, 25, and 26 with a larger electric field concentration, and the CNTs 24, 25, and 26 are more likely to be accumulated there. Thus, the electric field concentrates more at the counter section which has a smaller width of the electrode, and therefore, the CNTs 24 accumulate at the counter sections 21a-1 and 21b-1 facing each other of the pair of metal electrodes 21a and 21b of the CNT element 27 with higher density than the CNTs 25 and 26 accumulating at the counter sections 22a-1 and 22b-1 facing each other of the pair of metal electrodes 22a and 22b and the counter sections 23a-1 and 23b-1 facing each other of the pair of metal electrodes 23a and 23b. Changing the widths of the teeth portions, that is, of the counter sections 21a-1 and 21b-1 facing each other, the counter sections 22a-1 and 22b-1 facing each other, and the counter sections 23a-1 and 23b-1 facing each other enables the density and the number of the CNTs 24, 25, and 26 to be varied. Thus, it is possible to significantly change the characteristics among the CNT elements 27, 28, and 29.

Figure 13:
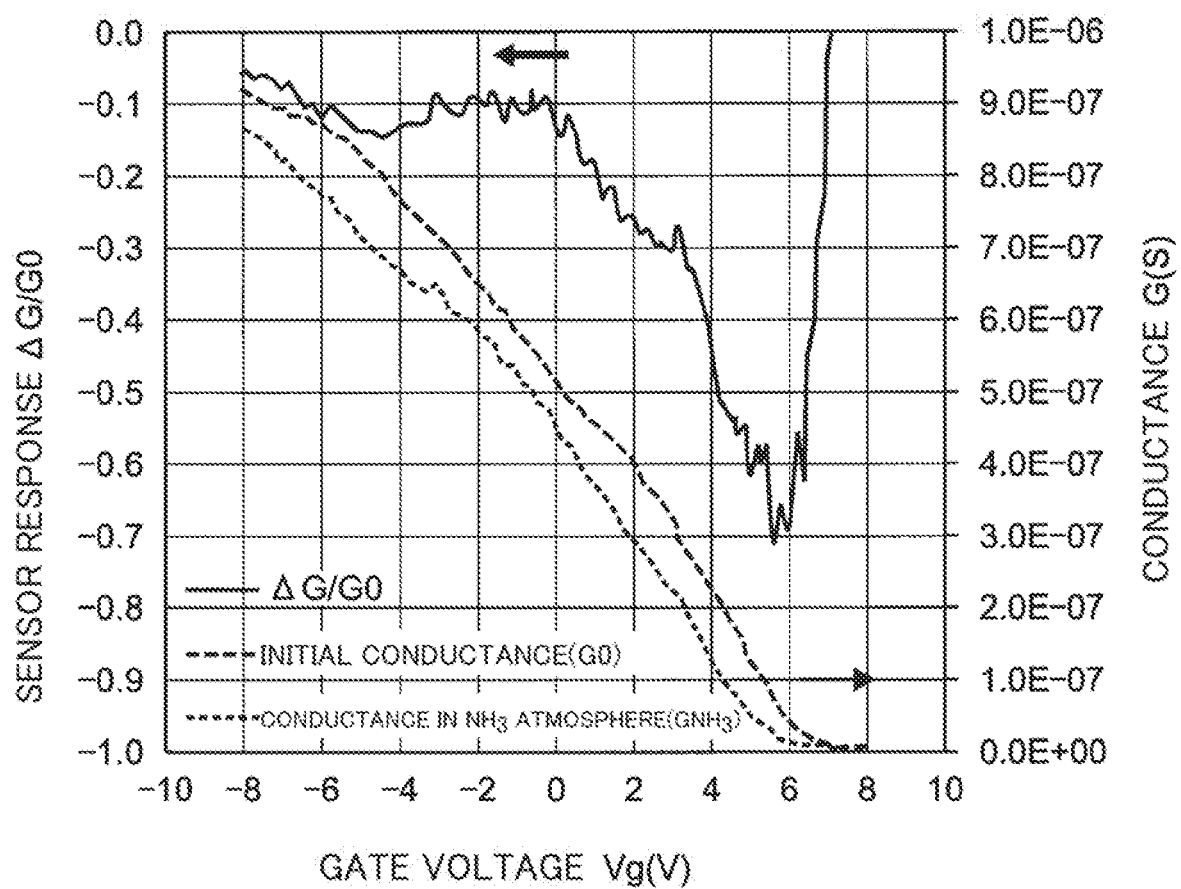
FIG. 13 is a graph illustrating a relationship between a gate voltage of the CNT sensor and the sensor response of the second embodiment of the present invention.

FIG. 13 is a graph illustrating the characteristic of the CNT element 29 of FIG. 7, that is, the CNT element 29 having the pair of metal electrodes 23a and 23b whose counter sections 23a-1 and 23b-1 facing each other have a width of 4 µm. The characteristic in air and the characteristic in a $NH_3$ gas having a concentration of 100 ppm are shown. The sensor response is a degree of change $\Delta G$ in conductance normalized by an initial conductance G0 in air. It can be seen that the sensor response $\Delta G/G0$ expresses dependency on a gate voltage Vg.

As can be seen from FIG. 13, the CNT element 29 shows a p-type semiconductor characteristic that the conductance increases when the gate voltage Vg is shifted to a negative side. Moreover, the conductance in the $NH_3$ atmosphere is reduced more than the initial conductance in the air. This is because $NH_3$ is a reducing gas, and thus, when the $NH_3$ is adsorbed on surfaces of the CNTs 26, electrons move from $NH_3$ molecules to the CNTs 26, which reduces the hole density of the surfaces of the CNTs 26. Under this condition, when the gate voltage Vg is 4 V to 6 V, the sensor response is large, and therefore, the concentration and the type of a gas can be calculated with high sensitivity and high accuracy. As described above, when the CNT elements 27, 28, and 29 have FET structures, it is possible to increase sensor sensitivity and detection accuracy, and expand the detection range of the CNT elements 27, 28, and 29.

Moreover, the plurality of CNT elements 27, 28, and 29 having different characteristics are provided, and therefore, based on pieces of data thereof, computation and calculation are performed, which enables the sensor sensitivity and the accuracy to be improved.

Third Embodiment

Figure 14:
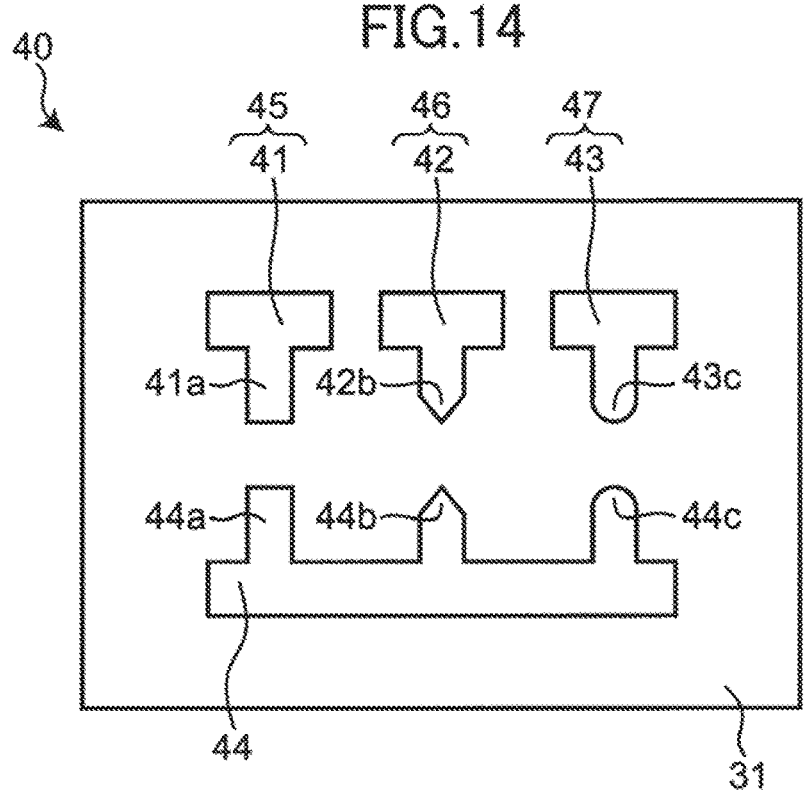
FIG. 14 is a plan view illustrating a CNT sensor of a third embodiment of the present invention.

FIG. 14 is a plan view illustrating a CNT sensor 40 of a third embodiment of the present invention.

First, main differences between the CNT sensor 40 of the third embodiment and the CNT sensor 20 of the second embodiment are as follows.

In the second embodiment, the widths of the counter sections facing each other of the plurality of pairs of electrodes are different from each other, whereas in the third embodiment, widths of counter sections facing each other of the plurality of pairs of electrodes are the same and tip forms of the counter sections facing each other are different.

Electrodes on one side of a plurality of pairs of electrodes of the plurality of CNT elements are integrated into one electrode.

As illustrated in FIG. 14, three CNT elements 45, 46, and 47 are formed on an insulation film 31 formed on a surface of a conductive Si substrate which is not shown and which is similar to the conductive Si substrate 30 shown in FIG. 8 of the second embodiment. The conductive Si substrate has a back surface provided with a metal electrode which is not shown and which is similar to the metal electrode 32 shown in FIG. 8 of the second embodiment.

The CNT element 45 includes a pair of metal electrodes 41 and 44 and CNTs (not shown because other members become difficult to be viewed) bridging the gap between counter sections 41a and 44a facing each other of the pair of metal electrodes 41 and 44. Similarly, the CNT element 46 includes a pair of metal electrodes 42 and 44 and CNTs (not shown because other members become difficult to be viewed) bridging the gap between counter sections 42b and 44b facing each other of the pair of metal electrodes 42 and 44. Similarly, the CNT element 47 includes a pair of metal electrodes 43 and 44 and CNTs (not shown because other members become difficult to be viewed) bridging the gap between counter sections 43c and 44c facing each other of the pair of metal electrodes 43 and 44.

Tip sections of the counter sections 41a and 44a facing each other of the metal electrodes 41 and 44 have a rectangular shape. Tip sections of the counter sections 42b and 44b facing each other of the metal electrodes 42 and 44 have a triangular shape. Tip sections of the counter sections 43c and 44c facing each other of the metal electrodes 43 and 44 have an oval shape. A gap between the tip sections facing each other of the counter sections 41a and 44a, the gap between the tip sections facing each other of the counter sections 42b and 44b, and the gap between the tip sections facing each other of the counter sections 43c and 44c are each, for example, 2 μm.

According to the sensor 40 having the above-described configuration, as illustrated in FIG. 14, the tip sections of the counter sections 41a and 44a facing each other of the pair of metal electrodes 41 and 44 of the CNT element 45 are rectangular, the tip sections of the counter sections 42b and 44b facing each other of the pair of metal electrodes 42 and 44 of the CNT element 46 are triangular, the tip sections of the counter sections 43c and 44c facing each other of the pair of metal electrodes 43 and 44 of the CNT element 47 are oval, and therefore, it is possible to change the density and the number of the CNTs which are to bridge the gaps between the tip sections.

When the CNT elements 45, 46, and 47 are formed by dielectrophoresis, larger dielectrophoretic force is exerted on the CNTs with a larger electric field concentration, and the CNTs are more likely to be accumulated there. Thus, electric field concentrates more at the counter sections 42b and 44b which face each other and whose tip sections are triangular and sharp than at the counter sections 41a and 44a which face each other and whose tip sections are rectangular and the counter sections 43c and 44c which face each other and whose tip sections are oval. Thus, the CNTs accumulate at the counter sections 42b and 44b with high density. Moreover, the size of the electric field concentration between the counter sections 41a and 44a which face each other and whose tip sections are triangular and the size of the electric field concentration between the counter sections 43c and 44c which face each other and whose tip sections are oval are different from each other, and it is thus possible to vary the density and the number of CNTs.

Thus, it is possible to significantly change the characteristic among the CNT elements 45, 46, and 47.

The CNT elements 45, 46, and 47 in the third embodiment are elements configured such that the shape of each of the tip sections of the counter sections 41a and 44a facing each other of the pair of metal electrodes 41 and 44, the shape of each of the tip sections of the counter sections 42b and 44b facing each other of the pair of metal electrodes 42 and 44, and the shape of each of the tip sections of the counter sections 43c and 44c facing each other of the pair of metal electrodes 43 and 44 are different from each other. Therefore, it is possible to change the density and the number of the CNTs which are to bridge the gaps between the tip sections of the counter sections 41a and 44a facing each other, the tip sections of the counter sections 42b and 44b facing each other, and the tip sections of the counter sections 43c and 44c facing each other.

In the third embodiment, the shape of each of the tip sections of the counter sections 41a and 44a facing each other of the pair of metal electrodes 41 and 44 is rectangular, the shape of each of the tip sections of the counter sections 42b and 44b facing each other of the pair of metal electrodes 42 and 44 is triangular, and the shape of each of the tip sections of the counter sections 43c and 44c facing each other of the pair of metal electrodes 43 and 44 is oval. This should not be construed as limiting, and the tip sections of the counter sections facing each other of the pairs of metal electrodes may be any shape such as a round shape, trapezoidal shape, and polygonal shape. Moreover, the tip sections of the counter sections facing each other of a pair of metal electrodes do not have to have the same shape but may be, for example, triangular and oval.

In the third embodiment, the counter section 44a of the counter sections 41a and 44a facing each other of the pair of metal electrodes 41 and 44 of the CNT element 45, the counter section 44b of the counter sections 42b and 44b facing each other of the pair of metal electrodes 42 and 44 of the CNT element 46, and the counter section 44c of the counter sections 43c and 44c facing each other of the pair of metal electrodes 43 and 44 of the CNT element 47 are connected to each other into one common section, and therefore, the switch 14b of the second embodiment shown in FIG. 2 is no longer necessary. On the other hand, the counter section 41a of the counter sections 41a and 44a facing each other, the counter section 42b of the counter sections 42b and 44b facing each other, the counter section 43c of the counter sections 43c and 44c facing each other are separated from one another, and therefore, it is possible to measure the electrical characteristic of each of the CNT elements 45, 46, and 47.

A method for fabricating the CNT sensor 40 of the third embodiment is similar to the method for fabricating the CNT sensor 20 of the second embodiment, but in a separation step of electrodes, electrodes on one side have to be separated.

Fourth Embodiment

Figure 15:
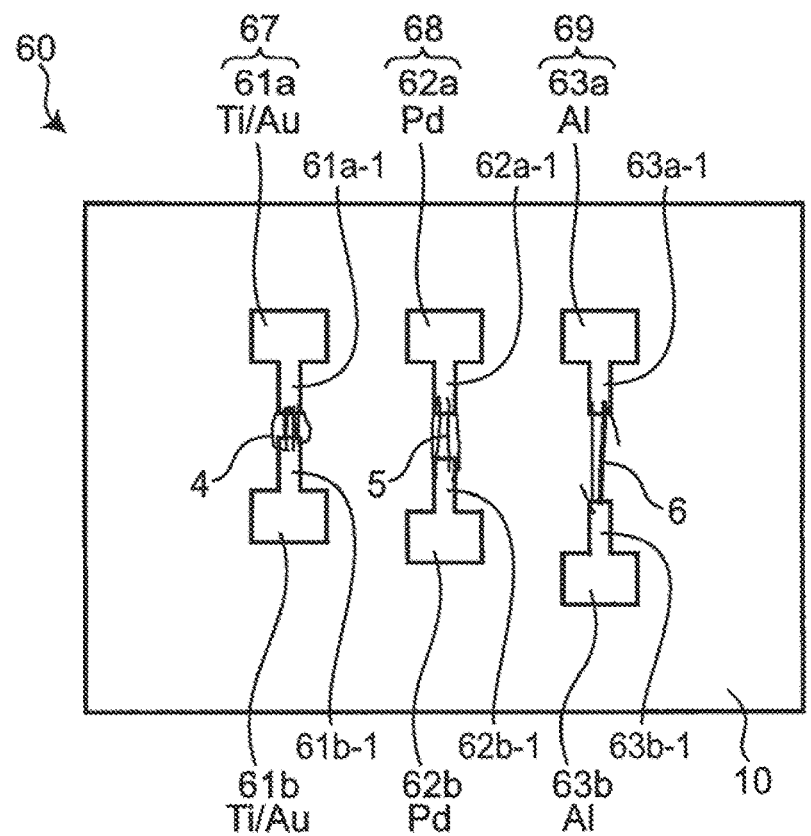
FIG. 15 is a plan view illustrating a CNT sensor of a fourth embodiment of the present invention.
Figure 16:
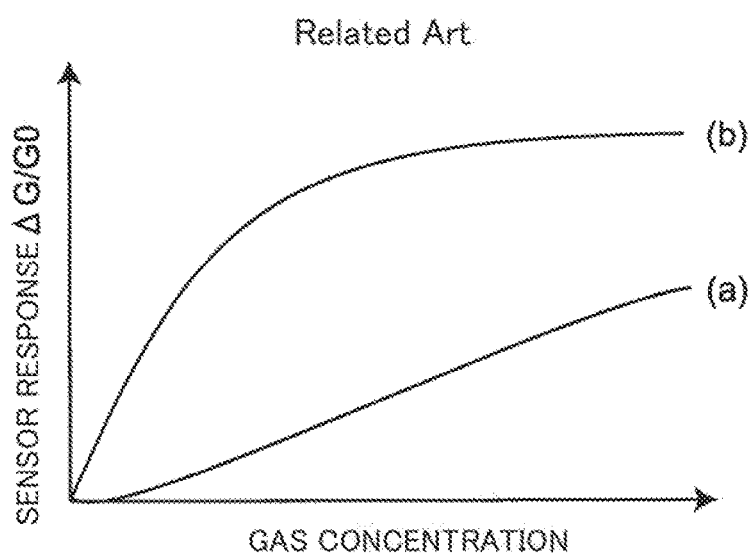
FIG. 16 is a graph illustrating a relationship between a gas concentration and a sensor response of a related CNT sensor.
Figure 17A:
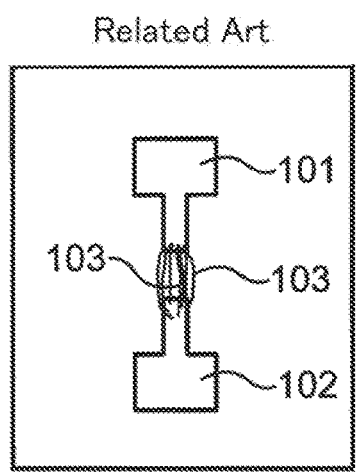
FIG. 17A is a view illustrating a problem of the related CNT sensor.
Figure 17B:
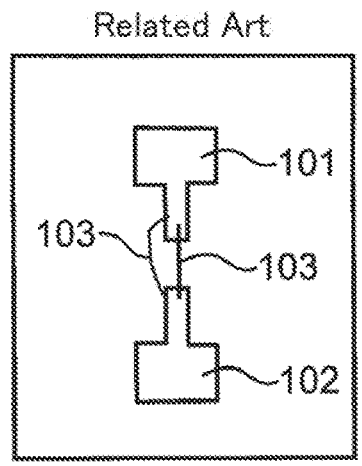
FIG. 17B is a view illustrating a problem of the related CNT sensor.

FIG. 15 is a plan view illustrating a CNT sensor 60 of a fourth embodiment of the present invention.

First, main differences between the CNT sensor 60 of the fourth embodiment and the CNT sensor 11 of the first embodiment are as follows.

In the first embodiment, the pairs of metal electrodes 1a and 1b, 2a and 2b, and 3a and 3b are made of the same electrode material, whereas in the fourth embodiment, an electrode material for a pair of metal electrodes 61a and 61b, an electrode material for a pair of metal electrodes 62a and 62b, and an electrode material for a pair of metal electrodes 63a and 63b are different from one another and are respectively Ti/Au, Pd, and Al.

In the fourth embodiment, points other than the above-described point are the same as those in the first embodiment.

As illustrated in FIG. 15, the CNT sensor 60 of the fourth embodiment includes CNT elements 67, 68, and 69 formed on an insulating substrate (e.g., glass substrate) 10. The CNT element 67 includes the pair of metal electrodes 61a and 61b and CNTs 4 bridging the gap between the metal electrodes 61a and 61b in the pair. The CNT element 68 similarly includes the pair of metal electrodes 62a and 62b and CNTs 5 bridging the gap between the metal electrodes 62a and 62b in the pair. The CNT element 69 includes the pair of metal electrodes 63a and 63b and CNTs 6 bridging the gap between the metal electrodes 63a and 63b in the pair.

The pair of metal electrodes 61a and 61b includes counter sections 61a-1 and 61b-1 the gap between which is bridged by the CNTs 4 and which face each other. The pair of metal electrodes 62a and 62b includes counter sections 62a-1 and 62b-1 the gap between which is bridged by the CNTs 5 and which face each other. The pair of metal electrodes 63*a* and 63*b* includes counter sections 63*a*-1 and 63*b*-1 the gap between which is bridged by the CNTs 6 and which face each other. The counter sections 61*a*-1, 61*b*-1, 62*a*-1, 62*b*-1, 63*a*-1, and 63*b*-1 each have a rectangular shape having a width of 1 μm and all have the same shape. The gap between the metal electrodes 61*a* and 61*b*, the gap between the metal electrodes 62*a* and 62*b*, and the gap between the metal electrodes 63*a* and 63*b* are respectively, for example, 1 μm, 2 μm, and 4 μm. The metal electrodes 61*a* and 61*b* are made of Ti/Au, the metal electrodes 62*a* and 62*b* are made of Pd, and the metal electrodes 63*a* and 63*b* are made of Al.

Thus, adopting different materials for the pair of metal electrodes 61*a* and 61*b*, the pair of metal electrodes 62*a* and 62*b*, and the pair of metal electrodes 63*a* and 63*b* enables contact resistance between each of the metal electrodes 61*a* and 61*b* and each CNT 4, contact resistance between each of the metal electrodes 62*a* and 62*b* and each CNT 5, and contact resistance between each of the metal electrodes 63*a* and 63*b* and each CNT 6 to be significantly changed, and it is possible to significantly change the characteristic among the CNT elements 67, 68, and 69.

Moreover, contact resistance between each CNT 4 and each of the metal electrodes 61*a* and 61*b*, contact resistance between each CNT 5 and each of the metal electrodes 62*a* and 62*b*, and contact resistance between each CNTs 6 and each of the metal electrodes 63*a* and 63*b* significantly change due to absorption of a gas or the like on the metal electrode surfaces, and the degree of change varies depending on a combination of the type of the gas and electrode materials. For example, when Pd is adopted as an electrode, a sensor response to a hydrogen gas increases as compared to a Ti/Au or Al electrode, and it is possible to distinguish the type of a gas by measuring a difference between responses depending on the electrode materials.

Thus, the characteristic of each of a nanofiber element 67 including the pair of electrodes 61*a* and 61*b* and nanofibers 4, a nanofiber element 68 including the pair of electrodes 62*a* and 62*b* and nanofibers 5, and a nanofiber element 69 including the pair of electrodes 63*a* and 63*b* and nanofiber 6 is significantly changed due to the electrode materials different from each other, and each piece of data of the nanofiber elements 67, 68, and 69 which significantly differ in characteristic is selected, and computation is performed, which enables the type and the concentration of, for example, a gas to be detected with high accuracy, and it is possible to obtain wide detection range, reproducibility, and high reliability. Moreover, it is possible to increase the yield of a nanofiber sensor 40.

In the fourth embodiment, the pairs of metal electrodes 61*a* and 61*b*, 62*a* and 62*b*, and 63*a* and 63*b* of the CNT elements 67, 68, and 69 are different from one another both in the metal material and in the electrode gap but may have the same electrode gap or may be different in the width or the shape.

In the fourth embodiment, the same material is used for the pairs of metal electrodes 61*a* and 61*b*, 62*a* and 62*b*, and 63*a* and 63*b* of the CNT elements 67, 68, and 69, but different materials may be used for electrodes in a pair. For example, materials for pairs of electrodes of the CNT elements may be, for example, Ti/Au and Pd, Pd and Al, Al and Ti/Au.

In the first to fourth embodiments, a carbon nanotube (CNT) is used as an example of a nanofiber in a broad sense, but the nanofiber sensor may be fabricated in the same manner also by adopting other nano-sized fibrous materials, such as Si nanowires, ZnO nanowires, GaN nanowires, nanofibers in a narrow sense, carbon nanofibers, polylactic acid nanofibers, and cellulose nanofibers.

Components described in the first to fourth embodiments and variations may be accordingly combined, or accordingly selected, replaced or deleted.

REFERENCE SIGNS LIST

1*a*, 1*b*, 2*a*, 2*b*, 3*a*, 3*b*, 21*a*, 21*b*, 22*a*, 22*b*, 23*a*, 23*b*, 41, 44, 42, 44, 43, 44, 61*a*, 61*b*, 62*a*, 62*b*, 63*a*, 63*b* ELECTRODE
4, 5, 6, 24, 25, 26 NANOFIBER
7, 8, 9, 27, 28, 29, 45, 46, 47, 67, 68, 69 NANOFIBER ELEMENT
1*a*-1, 1*b*-1, 2*a*-1, 2*b*-1, 3*a*-1, 3*b*-1, 21*a*-1, 21*b*-1, 22*a*-1, 22*b*-1, 23*a*-1, 23*b*-1, 41*a*, 44*a*, 42*b*, 44*b*, 43*c*, 44*c*, 61*a*-1, 61*b*-1, 62*a*-1, 62*b*-1, 63*a*-1, 63*b*-1 COUNTER SECTION
30 CONDUCTOR SUBSTRATE
31 INSULATION FILM
50, 55 DETECTION APPARATUS

The invention claimed is:

1. A nanofiber sensor comprising:
a plurality of pairs of electrodes;
a plurality of nanofibers bridging a gap between one of the plurality of pairs of electrodes and another one of the plurality of electrodes; and
a plurality of nanofiber elements, each nanofiber element including all of the electrodes physically connected through at least one of the plurality of nanofibers,
wherein one of the plurality of nanofiber elements includes a pair of the plurality of electrodes having a structure different from a structure of a corresponding pair of the plurality of electrodes included in another one of the plurality of nanofiber elements.

2. The nanofiber sensor according to claim 1, wherein the structures are a gap between the pairs of the plurality of electrodes.

3. The nanofiber sensor according to claim 2, wherein the structures are each also widths of counter sections included in the pair of the plurality of electrodes and facing each other.

4. The nanofiber sensor according to claim 2, wherein
the pair of the plurality of electrodes included in one of the plurality of nanofiber elements and the corresponding pair of the plurality of electrodes included in another one of the plurality of nanofiber elements are made of different materials from each other.

5. The nanofiber sensor according to claim 1, wherein the structures are each widths of counter sections included in the pair of the plurality of electrodes and facing each other.

6. The nanofiber sensor according to claim 1, wherein
the pair of the plurality of electrodes bridged by the nanofiber in one of the plurality of nanofiber elements includes counter sections facing each other, and
the counter sections have tip sections different, in shape, from tip sections of counter sections facing each other and included in the corresponding pair of the plurality of electrodes included in the another one of the plurality of nanofiber elements.

7. The nanofiber sensor according to claim 1, wherein the pair of the plurality of electrodes included in one of the plurality of nanofiber elements and the corresponding pair of the plurality of electrodes included in another one of the plurality of nanofiber elements are made of different materials from each other.

8. The nanofiber sensor according to claim 1, wherein
the pair of the plurality of electrodes included in one of the plurality of nanofiber elements and bridged by the nanofiber is disposed on an insulating film disposed on a surface of a conductive substrate,
the pair of the plurality of electrodes are source and drain electrodes,
the nanofiber is a channel,
the conductive substrate is a gate electrode, and
the insulating film is a gate insulating film.

9. The nanofiber sensor according to claim 1, wherein one of the plurality of nanofiber elements and another one of the plurality of nanofiber elements have changes in resistance or conductance different from each other.

10. The nanofiber sensor according to claim 1, further comprising a detector configured to detect a change in resistance or conductance of one of the plurality of nanofiber elements.

11. A nanofiber sensor comprising:
a plurality of electrodes;
a plurality of nanofibers bridging a gap between one of the plurality of electrodes and another one of the plurality of electrodes; and
a plurality of nanofiber elements, each nanofiber element including the plurality of electrodes and at least one of the plurality of nanofibers, and each nanofiber element having electrical properties independently measurable;
wherein one of the plurality of nanofiber elements includes a pair of the plurality of electrodes having a structure different from a structure of a corresponding pair of the plurality of electrodes included in another one of the plurality of nanofiber elements.

12. The nanofiber sensor according to claim 11, wherein the structures are a gap between the pairs of the plurality of electrodes.

13. The nanofiber sensor according to claim 12, wherein the structures are each also widths of counter sections included in the pair of the plurality of electrodes and facing each other.

14. The nanofiber sensor according to claim 11, wherein the structures are each widths of counter sections included in the pair of the plurality of electrodes and facing each other.

15. The nanofiber sensor according to claim 11, wherein
the pair of the plurality of electrodes bridged by the nanofiber in one of the plurality of nanofiber elements includes counter sections facing each other, and
the counter sections have tip sections different, in shape, from tip sections of counter sections facing each other and included in the corresponding pair of the plurality of electrodes included in the another one of the plurality of nanofiber elements.

16. The nanofiber sensor according to claim 11, wherein the pair of the plurality of electrodes included in one of the plurality of nanofiber elements and the corresponding pair of the plurality of electrodes included in another one of the plurality of nanofiber elements are made of different materials from each other.

17. The nanofiber sensor according to claim 11, wherein
the pair of the plurality of electrodes included in one of the plurality of nanofiber elements and bridged by the nanofiber is disposed on an insulating film disposed on a surface of a conductive substrate,
the pair of the plurality of electrodes are source and drain electrodes,
the nanofiber is a channel,
the conductive substrate is a gate electrode, and
the insulating film is a gate insulating film.

18. The nanofiber sensor according to claim 11, wherein one of the plurality of nanofiber elements and another one of the plurality of nanofiber elements have changes in resistance or conductance different from each other.

19. The nanofiber sensor according to claim 11, further comprising a detector configured to detect a change in resistance or conductance of one of the plurality of nanofiber elements.

20. A nanofiber sensor comprising:
a plurality of pairs of electrodes; and
a plurality of nanofibers at least one of which bridges a gap between electrodes in each of the plurality of pairs of electrodes, wherein
at least two of the plurality of pairs of electrodes are different from each other in structures; and
at least two of the plurality of pairs of electrodes are different from each other in shapes of tip sections of counter sections facing each other of the at least two of the plurality of pairs of electrodes.

* * * * *